United States Patent [19]

Moore

[11] 4,225,627

[45] Sep. 30, 1980

[54] DEMOLDING CONFECTIONS WITH STEAM

[75] Inventor: Carl O. Moore, Rochester, Ill.

[73] Assignee: A. E. Staley Manufacturing Company, Decatur, Ill.

[21] Appl. No.: 1,627

[22] Filed: Jan. 8, 1979

[51] Int. Cl.$^3$ .................... A23G 3/00; A23L 1/236
[52] U.S. Cl. ................... 426/548; 264/335; 426/389; 426/511; 426/512; 426/578; 426/660; 426/661
[58] Field of Search ............... 426/548, 549, 578, 658, 426/660, 661, 389, 511, 512, 811; 264/335; 425/437, DIG. 106; 249/66 R, 66 A

[56] References Cited

U.S. PATENT DOCUMENTS

| | | | |
|---|---|---|---|
| 1,883,482 | 10/1932 | Bausman et al. | 425/437 X |
| 2,726,960 | 12/1955 | Bolanowski | 426/578 |
| 3,218,177 | 11/1965 | Robinson et al. | 426/578 |
| 3,271,820 | 9/1966 | Hendry | 425/437 X |
| 3,695,804 | 10/1972 | Layman | 264/335 X |
| 3,952,991 | 4/1976 | Schneider | 264/335 X |
| 4,120,987 | 10/1978 | Moore | 426/660 X |

FOREIGN PATENT DOCUMENTS 1005674 9/1964 United Kingdom.

OTHER PUBLICATIONS

Cruden, "Revolutionary Starchless Molder", *Candy Industry*, vol. 132, No. 8, 4-15-1969, pp. 10-11 & 72.
"Continuous Starchless Cream Center Molding", *The Manufacturing Confectioner*, 4-1969, p. 65.
"American Operation of 'Modified' Starchless Moulding System", *Confectionery Production*, 1-1974, pp. 14-16 & 34.
Cockinos, "Varieties of Moulding Operations are Flexible, Automatic, Economical", *Candy & Snack Industry*, vol. 138, No. 7, pp. 28, 31 & 73, 6-1973.
Bolanowski, "Gears Continuous Cooking-Cooling to Product Needs", *Food Engineering*, vol. 41, pp. 83-86, 11-1969.
"Innovates Starchless Molding of Cream Centers", *Food Engineering*, vol. 45, pp. 81, 82 & 84, 8-1973.

*Primary Examiner*—Arthur L. Corbin
*Attorney, Agent, or Firm*—M. Paul Hendrickson; Charles J. Meyerson

[57] ABSTRACT

In the demolding of confectionery products (especially high-amylose candy recipes) steam pressure, which is applied between the surface of the mold and molded confectionery product, can be effectively employed to expel the product from a fixed or permanent mold. The steam pressure effectively functions as a self-lubricating and self-dissipating agent which cleanly separates the molded confection from the mold. Temporary chemical release or permanent release coating agents are not needed.

14 Claims, No Drawings

DEMOLDING CONFECTIONS WITH STEAM

BACKGROUND OF THE INVENTION

Molded confectionery products are prepared by depositing a fluid confectionery mass into a preformed mold, allowing the fluid confectionery mass to solidify or gel therein and removing the solidified or gelled confectionery product from the mold. Preformed depressions in a bed of dry powdered starch are the most commonly used method. Within recent years, permanent molds have become popular with a few high volume manufacturers. This technique is often referred to as "starchless molding". Starchless molding relies upon a preformed solid mold. The starchless molds are usually constructed in a tray form, each of which may contain a hundred or more depressions with the trays being operatively connected with one another to form a continuous belt or conveyor. In a continuous starchless molding operation for soft confections, each mold is typically coated with a special release agent, the fluid confectionery recipe ingredients are then cast or deposited into the starchless mold (depositing), solidified therein (tempering), mechanically ejected therefrom (demolding), cleaned and coated with fresh release agent for recycling. In demolding, the mechanical ejection may be accomplished by mechanical fingers which force the gelled composition from a deformed flexible mold (e.g., molds constructed of synthetic or natural rubber molds) or by air expulsion from a rigid mold.

Several publications have described suitable equipment and processing conditions for the mass production confectionery products by starchless molding (e.g., see "Revolutionary Starchless Molder", *Candy Industry*, Vol. 132, No. 8, April 15, 1969, pages 10–11, 72 and 85; British Patent Specification No. 1,005,674 by Baker-Perkins Ltd.; "Continuous Starchless Cream Center Molding" *The Manufacturing Confectioner* for April 1969, page 65; "American Operation of 'Modified' Starchless Moulding System", *Confectionary Production*, January 1974, pages 14–16 and 34; "Varieties of Moulding Operations are Flexible, Automatic, Economical" *Candy and Snack Industry*, Vol. 138, No. 7, pages 28, 31 and 73, June 1973; "Gears Continuous Cooking-Cooling to Product Needs", *Food Engineering*, pages 83–86, November 1969; "Innovates Starchless Molding of Cream Centers", *Food Engineering*, Vol. 45, pages 81–84, August 1973).

Incomplete and non-uniform release of the solidified confectionery product from the mold are particularly troublesome problems since sugar solutions tend to stick to any mold surface. Numerous proposals have been made to improve upon the release of the solidified confectionery product from the mold. In an attempt to overcome these problems, polytetrafluoroethylene is conventionally used as a permanent mold coating. For soft confections, a temporary release agent coating (e.g., acetylated monoglyceride) is necessarily applied before each deposition of fluid confection into the mold.

To further facilitate demolding, each tray is typically equipped with mechanical means to individually pivot the tray at a 45° angle during demolding. Each impression or mold within the tray also contains port holes for air injection. In conventional operations, the fluid recipe is automatically deposited into each mold, the molds are then moved through a tempering tunnel to solidify or gel the confection and ejected by applying pressure to the bottom of the flexible mold to force the confection out of the mold or by compressed air which passes through tiny holes in the bottom of each of the molds while they are tilted at an inverted angle. Critical processing factors for effective air demolding include the size and configuration of the holes within the base of the mold impression, the type of release agent and how it is applied, the mold design and construction, air pressure, cooling time and conditions, etc. In a continuous operation, each mold is cleaned so that it is free from solidified confectionery product and microbial contamination before recoating with fresh release agent and recycling.

A wide variety of molded confectionaries may be formulated with high-amylose starches. Illustrative high-amylose-containing confectionery product recipes include short, relatively rigid, resilient textured confections, such as gum confections or starch jellies (e.g., gum drops, gum slices such as lemon and orange slices, gum centered candies and the like as disclosed in U.S. Pat. Nos. 3,218,177 and 3,446,628 by Robinson et al.), confections of a tractile, long, inelastic, cream-like texture (e.g., cream fondants, marshmallow cream centers, cast caramel centers, etc., such as disclosed in U.S. Pat. No. 3,687,690 by Carl O. Moore), aerated confections having the textural and eating quality of grained aerated confections (e.g., nougat and grained marshmallow confections, etc. as disclosed in U.S. Pat. No. 4,120,987 by Carl O. Moore) and other confectionery products which rely upon high-amylose starch to impart a structural support to the molded confectionery product. For molded confectionery products the high-amylose-containing recipes have not been successfully utilized in starchless molding because they cannot be effectively removed by mechanical or air pressure.

The inventor desired to simplify demolding without requiring special release agents in starchless confectionery molding. An effective means for releasing gelled confections from the molds without requiring either permanent (e.g., polytetrafluoroethylene) or temporary mold coatings would significantly improve upon demolding efficacy. A demolding system which would effectively function as a self-lubricating, and self-dissipating release agent while cleaning the mold from debris and pasteurizing or sterilizing the mold against microbial contamination would represent a significant demolding improvement.

OBJECTS OF THE INVENTION

It is an object of the present invention to simplify the process for removing solidified or gelled confections from a solid mold in confectionery manufacture.

Another object of the invention is to provide a more effective and economical method for expelling gelled confections from a solid or fixed surface mold.

An additional object of the invention is to eliminate the need for molds permanently coated with polymeric release agents as well as the need for applying a temporary release agent to each mold prior to each deposition of fluid confectionery therein.

A still further object of the invention is to provide a demolding operation wherein the release agent will function as an antimicrobial cleansing agent.

Another object of the invention is to provide an environmentally safe release agent which will not contaminate the molded confection and will readily dissipate from the mold after the demolding step.

DESCRIPTION OF THE INVENTION

According to the present invention there is provided a method for preparing a molded confectionery product which comprises the steps of: (a) preparing a fluid mass of confectionery ingredients containing high-amylose starch as a congealing agent; (b) depositing the fluid mass in a solid mold; (c) gelling the fluid mass within the mold to provide a molded confectionery product; and (d) expelling the gelled confectionery product from the mold with steam pressure.

The combination of high-amylose-containing confection and steam pressure to expel the gelled confectionery products from solid molds affords a plurality of demolding benefits. Without deforming the structural integrity of the molded piece, the steam pressure superficially liquifies the gelled surface of the product while applying pressure to cleanly separate and expel the molded confectionery product from the mold. Compaction and surface imperfections (e.g., pin-holes, voids, etc.), caused by non-uniform air pressure upon the surface of the gelled or solidified product during the gas expulsion step, is alleviated by the immediate uniform regelation upon its expulsion. The steam also functions as a cleansing agent and potent antiseptic for the mold and expelled product. Surface contamination of the confectionery product with a greasy release agent is avoided. The steamed surface is compatible with enrobing and sugar coating recipes (process and ingredients). Without requiring further preparation, the expelled confection may be directly sugared. The requirement for cleaning and applying fresh release agent (e.g., acetylated monoglyceride) to each mold before recycling is also avoided by the use of steam as a release agent. Unlike the non-volatile release agents heretofore used in starchless candy molding operations, the steam release agent will readily and harmlessly dissipate into the atmosphere. Molded confectionery products of a more uniform, sharper and clearer image are obtained thereby. The speed, overall efficacy and economy of the molded confectionery process are significantly improved. Other advantages include a lesser degree of criticality in the expulsion pressure, design and configuration of the gas expulsion ducts, the materials used to fabricate the molds, the angle of mold inversion during the expulsion step, the recipe ingredients, tempering, etc.

A broad range of molded confectionery products with widely divergent textural and eating qualities may be utilized. Confectionery receipes, as mentioned above, which contain high-amylose starch as a congealing agent or a binder for the recipe ingredients upon cooling are particularly useful. Broadly, the applicable high-amylose starches include starches containing at least 35% amylose. Such high-amylose starches may be obtained from a variety of starch sources (e.g., wrinkled pea, potato, corn etc.). Modified and unmodified high-amylose starches may be used. Fractionation processes which enrich the amylose content by amylopectin separation therefrom (e.g., more than 50% amylose to amylose fractions substantially free from amylopectin) are a commercial source of high-amylose starches. More commonly, the domestically available high-amylose starches will contain at least 50% amylose and are derived from high-amylose corn hybirds (e.g., 50%, 55%, 70%, 75%, etc.). These high-amylose starches are insoluble in boiling water and require superatmospheric pressures and elevated temperatures (e.g., higher than 110° C.) for homogeneous dispersal or dissolution into aqueous mediums. Such homogeneously dispersed or dissolved high-amylose molecules possess film-forming properties and will form a supportive matrix for the confection ingredients when cooled to temperatures below their congealing temperature. Illustrative high-amylose starches include those disclosed in U.S. Pat. Nos. 4,120,987, 3,987,210 and 3,687,690 and the like. High-amylose starch hydrolyzates (e.g., enzymatic or acid-thinned) having an alkali fluidity of about 20 cc to 90 cc and preferably between about 50 cc to about 80 cc (e.g., see my U.S. Pat. No. 3,687,690) are especially useful in molding confectionery recipes.

The most predominant recipe ingredient for these high-amylose confections is the sweetening agent or sweetener. The sweetening agent concentration and sweetener type can be altered to suit the textural and sweetness properties of the desired end-product. A broad range of sweeteners may be used. In general, the sweetening agents include those of a high sweetening power (e.g., non-nutritive sweeteners such as saccharin, cyclamates, dipeptides, chalcones, etc.), saccharides of an intermediate sweetness and weak sweeteners (e.g., low D.E. starch hydrolyzates, polysaccharides of $D.P._3$ and higher, etc.). Either crystallizable or non-crystallizable sweetening agents may be freely interchanged, as desired in the recipe. Advantageously the sweetening agent is selected from a variety of reducing and non-reducing processed carbohydrate sources including the fermentable saccharides (e.g., mono-, di- and trisaccharides) and non-fermentable polysaccharides (e.g., $D.P._4$ and higher). Illustrative saccharide sweetening agents include dextrose, lactose, fructose, sucrose, maltose, maltotriose, xylose, $D.P._4$ and higher saccharides (e.g., maltodextrin), mixtures thereof and the like. The gel character, tenderness, moisture content, grain, firmness, etc. of the molded confection may be modified by sweetener type and/or its concentration. Less expensive corn syrup and maltodextrin (e.g., D.E. 10-100) are desirably used to replace more costly sugars such as sucrose. Saccharide sweeteners having an equivalent or higher sweetening power than sucrose (e.g., fructose) may also be used at lower concentrations to achieve a comparable level of sweetness. The humectant saccharide sweeteners (which impart water-retention properties to the confection) include the reducing mono- and di- saccharides such as fructose, dextrose, maltose, conversion syrups rich in humectant saccharides, mixtures thereof and the like. Such humectants improve storage stability (e.g., moisture depletion by drying and aging), packaging and enrobing ingredient cost reduction, mouth-feel, moistness, tenderness, short gel character, permit a significant replacement of the costly confection solids with water (without detracting from its overall high quality) while facilitating the release of confectionery product from the mold during the demolding operation.

The relative proportion of sweetening agent to high-amylose in the recipe may vary considerably and will depend largely upon the sweetener type and sweetness level as well as the textural and eating qualities of the desired end-product. In general, most recipes will range between about 2 to about 20 parts by weight high-amylose starch for each 100 parts by weight sweetening agent (d.s.b.). In starch jellies the recipe will typically contain about 2 to about 10 parts by weight (most typically at about 3 to about 7 pbw) high-amylose starch, for cast caramels about 5 to about 15 parts by weight high-amylose starch (most typically between about 7 to about 10 pbw) and aerated confections (e.g., nougats) between about 3 to about 15 pbw (most typically between about 5 to about 10 pbw) for each 100 parts by weight sweetening agent. The chewiness and toughness may be increased by increasing the amylose content.

In addition to sweetening agent and high-amylose starch, aerated and non-aerated molding candy recipes, which have a tractile, long, inelastic, cream-like texture (e.g., see U.S. Pat. Nos. 3,687,690 and 4,120,987, both by Carl O. Moore) are often formulated with film-forming proteins (e.g., egg albumin, gelatin, milk solids or casein, hydrolyzed vegetable whipping proteins, etc.) to impart body and center textural properties to the molded confection products. Such confectionery protein recipes (e.g., see U.S. Pat. No. 4,120,987, column 1, lines 32–34 and lines 47–51; column 2, lines 17–20 and column 3, line 21-column 4, line 10 for illustrative proteins), are applicable to the steam expulsion method herein. The amount of film-forming protein will primarily depend upon the type of confection product which is desired. For confections in which the protein is utilized for nutritional purposes (e.g., high protein candies) up to about 25 parts film-forming protein for each 100 parts by weight sweetener may be used. If the film-forming protein is utilized primarily as a whipping protein, the amount of protein film-former will usually range between about 0.1 to about 5 parts by weight for each 100 parts sweetener with levels of about 0.5 to about 2 pbw being more typical. Heat-denaturable film-forming proteins are occasionally incorporated into the recipe to achieve the desired level of chewiness and toughness.

Other conventional additives such as flavoring, coloring agents, microbides, whipping agents, surface active agents, congealing agents, antioxidants, acidulants, hemectants, fats, oils, surface active agents, gums, starches, solid or particulated foods (e.g., nuts, etc.), and the like may be incorporated into the recipe. The textural quality of the aerated confection may be modified (e.g., made more chewy or more tender) by the recipe addition of other edible hydrophilic film-formers such as dextrin, carboxymethyl cellulose, hydroxypropyl cellulose, hydroxyethyl cellulose, pregelled starches, (e.g., corn starch, potato starch, waxy maize starch, inhibited starch, the gelatin and heat-denaturable protein, etc.) in small amounts.

As recognized by the art, the textural properties of starch jellies are improved by recipes which contain both a high-amylose starch and a low amylose starch (e.g., less than 30% amylose), or a gelatinized low amylose (e.g., see U.S. Pat. Nos. 3,218,177 and 3,137,579). Such recipe combinations can be effectively utilized in the demolding of this invention.

The amount of water provided in the recipe formulation should be sufficient to dissolve the water, high-amylose, sweetening agent recipe, water-soluble protein (if used), and other soluble components and to provide the desired confection texture. Typically the amount of water utilized in preparing such molded confections will range from about 15 to about 50 parts by weight water for each 100 parts by weight of dissolved recipe solids. Preferably, the amount of water used to dissolve the recipe ingredients will comprise from about 20 to about 30 weight percent of thhe confectionery dry solids weight. After the solid recipe ingredients have been homogeneously dispersed or dissolved into the aqueous phase, the recipe is advantageously concentrated before depositing to at least 70% by weight solids and preferably between about 75% to about 85% solids while retaining the solids homogeneously therein (e.g., at elevated temperatures).

The high-amylose starch is typically cooked in the presence of water under superatmospheric pressure and temperatures in excess of 100° C. (e.g., steam cooked such as by retort or jet cooking), to uniformly and homogeneously disperse the high-amylose starch into an aqueous dispersion (frequently referred to by the art as gelatinization). To superatmospherically cooked and homogeneously dispersed high-amylose starch will congeal at temperatures below 100° C. to form a water-insoluble starch film. The high-amylose starch congealing rate and temperature will depend upon its concentration, the concentration of congealing inhibitors (monosaccharides, disaccharides, etc.), the time interval and temperature degreess the starch is maintained below its congealing point, the amount of agitation and other factors known to affect the congealing temperature of gelatinized high-amylose aqueous dispersions. The high-amylose starch may be incorporated into the recipe formulation at any stage before it retrogrades to a water-insoluble form. It is advantageous to incorporate at least a major weight portion of the total sweetening agent recipe requirements into the recipe before the high-amylose starch congeals to its water-insoluble form. The overall confection quality and ease of preparation are significantly improved by cooking and dissolving at least a major portion (preferably at least 85% and most preferably at least 90%) of the total recipe sweetening agent into the recipe along with other dissolved high-amylose starch and used, the water-soluble protein and other soluble recipe ingredients as may be conventionally incorporated into the fluid confection mass.

The present invention affords a more simplified mold design and configuration. A variety of molds having concave depressions and equipped with means for admitting steam pressure and forcing the solidified confection from the mold during the demolding may be used. Similar to conventional starchless molds, the steam port or ports are advantageously centrally positioned near the bottom of the impression. In contrast to the most effective conventional mold, which typically contains four or five centrally placed air ports of a very specific configuration, a single steam injection port is generally sufficient to expel the solidified confection from the mold. If desired, however, additional steam injection ports may be provided to each mold, but are not required.

Although molds of a wide variety of construction may be used in the present invention (e.g., rubber, plastic, wood, metals, porcelain, etc.), it is advantageous to use a mold or molds coated with a material having a relatively high degree of heat conductance. Such molds more rapidly dissipate the heat from the injected steam along the surface of the mold impression and thereby greatly reduce the adhesive forces between the confection and the die surface. Metallic molds or molds coated with metallic substances (e.g., aluminum, stainless steel, tin, copper, bronze, steel, iron, etc.) are particularly effective heat transfer agents.

The temperature and pressure of the steam injected into the mold should be sufficient to expel the solidified confection from the mold. Under superatmospheric conditions, steam pressure and temperature are dependent variables. Excessive steam pressure which causes deformation of the solidified confection should be avoided. This, however, is not normally a problem because of the efficacy of steam in expelling the product from the mold.

Elevated steam temperatures and pressures will accelerate the demolding rate. However, low steam pressure and temperatures are surprisingly effective. The effectiveness of steam is apparently due to the combined affect of heat, moisture and pressure upon the gelled pieces within the mold. This combination reduces the molded confection piece adhesiveness to the mold without adversely affecting cohesiveness of the molded confection piece. The most suitable steam demolding pressure and temperature for any given molded confection will depend primarily upon the cohesiveness of the gelled confectionery piece. Gelled pieces with a lower degree of gelled cohesiveness will generally require lower temperatures and pressures than the more cohesive confections. Although the invention contemplates steam pressure above the boiling point of water, it is more pragmatic to expel the gelled confection from the mold with saturated steam pressure having a steam temperature of greater than about 105° C. and advantageously 110° C. or higher. Starch jellies having sufficient structural cohesiveness to maintain structural integrity during demolding may be illustratively expelled from the mold at a saturated steam pressure ranging from about 5 psig to about 50 psig (preferably less than 25 psig) while cast caramels and nougats are advantageously expelled at reduced pressures (e.g., less than 15 psig and preferably at less than 10 psig) with multiple steam orifices.

During the demolding step, the trays are advantageously placed in an inverted position. This will reduce the steam expulsion requirements. Because of the effectiveness of steam, the angle of inversion is not as critical as is the case with conventional demolding processes wherein compressed air is used to expel the confectionery product from the mold. Typically the mold is inverted to an angle sufficient to permit complete expulsion of the solidified confection from the mold.

The term "gelled" refers to confections which retain sufficient structural stength to permit their expulsion from the mold with steam pressure. Although surface skinning may provide sufficient structural strength to permit steam expulsion, the demolding process is advantageously applied to those confections characterized as having a relatively uniform cross-sectional texture and consistency. Gelled confections ranging from a pliable, plastic consistency to a solidified gel structure are effectively demolded. In the preferred embodiments, the demolding process is applied to pliant confections which are compressible with internal resistance towards compression such as nougats or cast caramels to a starch jelly as opposed to hard candies (highly resistant towards compression) and cream centers which flow and have only a nominal resistance towards compression.

The invention applies to continuous confectionery manufacture as well as manual processes wherein separate trays are tempered for a period of time sufficient for steam demolding. Readily gellable confections (e.g., starch jelly) typically require less than 10 minutes tempering while softer candies may require tempering for several hours.

EXAMPLE

An orange-flavored starch jelly confectionery base was prepared by preheating 13.2 parts by weight modified high-amylose starch[1], 13.2 parts by weight unmodified high-amylose starch[2], 80 pbw sucrose and 114 parts by weight 64 D.E. corn syrup[3] to 99° C. and then jet cooked at 330° F. followed by adding orange flavoring and coloring. The resultant fluid confectionery mass (80% dry solids) was deposited (at about ⅜" thickness) into an aluminum muffin pan which contained 12 molds having a 4.5 cm top diameter, a 3.0 cm flat base diameter and depth of 2.0 cm. A single perforation (2 mm diameter) was made in each of nine molds with the three remaining molds being unperforated. In order to retain the fluid mass within the mold, the perforations were sealed by externally placing an aluminum foil sheet on the bottom of the pan. The deposited fluid mass solidified by cooling within forced air (15° C.) for ten minutes. The aluminum foil sheet was then removed.

1-MIRA-CREME modified high-amylose starch, manufactured and sold by A. E. Staley Manufacturing Company (acid-hydrolyzed 55% amylose starch, 11.5% moisture and 60 ml. alkaline fluidity).

2-MIRA-QUICK C unmodified 55% high-amylose starch, manufactured and sold by A. E. Staley Manufacturing Company containing 11.5% moisture.

3-SWEETOSE 4400 (DE 64%, 39% dextrose, 33% maltose, 12% maltotriose, 16% D.P.$_4$) manufactured and sold by A. E. Staley Manufacturing Company.

The solidified molded confections were expelled from the molds by injecting 10 psig steam (115° C.) into each mold (rubber hose conduit) while holding the tray in an inverted position (180°). The steam pressure quickly expelled each piece without leaving any product residue. No surface or interior imperfections were observed. The ejected pieces were directly sugared. The steamed surface provided sufficient wetting to permit the sugar to adhere to each piece without further processing. The three pieces contained in the unperforated molds could not be easily removed from the molds. In another test, mineral oil was applied to each mold prior to depositing of the fluid confection therein. The demolding results of this test were comparable to those achieved without the mineral oil release agent.

In an additional test, the confectionery base dry solids was reformulated to 10 parts by weight thin boiling starch[4], 4 parts modified high-amylose corn starch[1], 36 parts by weight sucrose and 90 parts by weight 64 D.E. corn syrup[3]. No release agent except steam was used. The gelled product has less body, but had sufficient cohesiveness to retain its shape during the demolding and sugar sanding thereof. The molded pieces were quickly and cleanly demolded with steam. The quality of these steam ejected pieces were at least comparable to orange jellies conventionally prepared with starch molds.

4-Confectionary ECLIPSE G—an acid-thinned granular regular dent corn starch, manufactured and sold by A. E. Staley Manufacturing Company.

I claim:

1. A method for preparing a molded confectionery product which comprises the steps of: (a) preparing a fluid mass of confectionery ingredients containing high-amylose starch as a congealing agent; (b) depositing the fluid mass in a solid mold; (c) gelling the fluid mass within the mold to provide a molded confectionery product; and (d) expelling the gelled confectionery product from the mold with steam pressure.

2. The method according to claim 1 wherein the confection contains from about 2 to about 20 parts by weight high-amylose starch for each 100 parts by weight sweetening agent.

3. The method according to claim 2 wherein the gelled confection is expelled from the mold by directly applying steam pressure between the interface of the mold and the molded confectionery product.

4. The method according to claim 3 wherein the steam pressure is injected through at least one orifice positioned in the base of the mold while positioning the mold at an inverted angle.

5. The method according to claim 4 wherein the surface of the mold consists essentially of a heat conductive metal.

6. The method according to claim 4 wherein the amount of high-amylose starth in the molded confection product ranges from about 3 to about 10 parts by weight high-amylose starch for each 100 parts by weight sweetening agent and the moisture content ranges from about 15% to 25% by weight.

7. The method according to claim 6 wherein the amylose content of the high-amylose starch is at least 50% by weight.

8. The method according to claim 7 wheein the gelled confection is characterized as having a consistency ranging from a pliable plastic mass to a pliable solidified mass.

9. The method according to claim 8 wherein the confectionery product comprises a starch jelly candy.

10. The method according to claim 3 wherein the temperature of the steam applied to the interface is at least 110° C.

11. The method according to claim 3 wherein the mold is constructed of heat conductive metal and the steam pressure ranges from about 5 psig to about 25 psig.

12. The method according to claim 11 wherein the high-amylose content of the high-amylose starch is at least 50% with the amount of high-amylose starch in the molded confection product ranging from about 3 to about 10 parts by weight for each 100 parts by weight sweetening agent.

13. The method according to claim 12 wherein the molded confectionery product contains between 75% to about 85% dry solids.

14. The method according to claim 13 wherein the molded confectionery product is a starch jelly candy.

* * * * *